United States Patent [19]
Gause

[11] 3,859,840
[45] Jan. 14, 1975

[54] ERGOMETER CALIBRATOR
[75] Inventor: Raymond L. Gause, Huntsville, Ala.
[73] Assignee: The United States of America as represented by the Administrator of the National Aeronautics and Space Administration, Washington, D.C.
[22] Filed: Oct. 31, 1973
[21] Appl. No.: 411,572

[52] U.S. Cl. .................................... 73/1 R, 73/379
[51] Int. Cl. ........................................... G01l 25/00
[58] Field of Search ...................... 73/1 R, 1 C, 379

[56] References Cited
UNITED STATES PATENTS
2,784,591   3/1957   Shoor ................................... 73/379
3,192,772   7/1965   Tarter ................................... 73/379
3,744,480   7/1973   Gause et al. ..................... 73/379 X Primary Examiner—Richard C. Queisser
Assistant Examiner—Frederick Shoon
Attorney, Agent, or Firm—Wayland H. Riggins; L. D. Wofford, Jr.; John R. Manning

[57] ABSTRACT

An apparatus for accurately calibrating ergometers so that the work rate produced by the particular ergometer being calibrated is accurate. The apparatus includes a D.C. motor which is coupled directly to the ergometer for rotating such at various speeds. Positioned on the shaft between the D.C. motor and the ergometer is a torque sensor and tachometer, which feeds signals to a power computer for subsequent recording. A speed controller is utilized with the D.C. motor.

3 Claims, 3 Drawing Figures

PATENTED JAN 14 1975
3,859,840
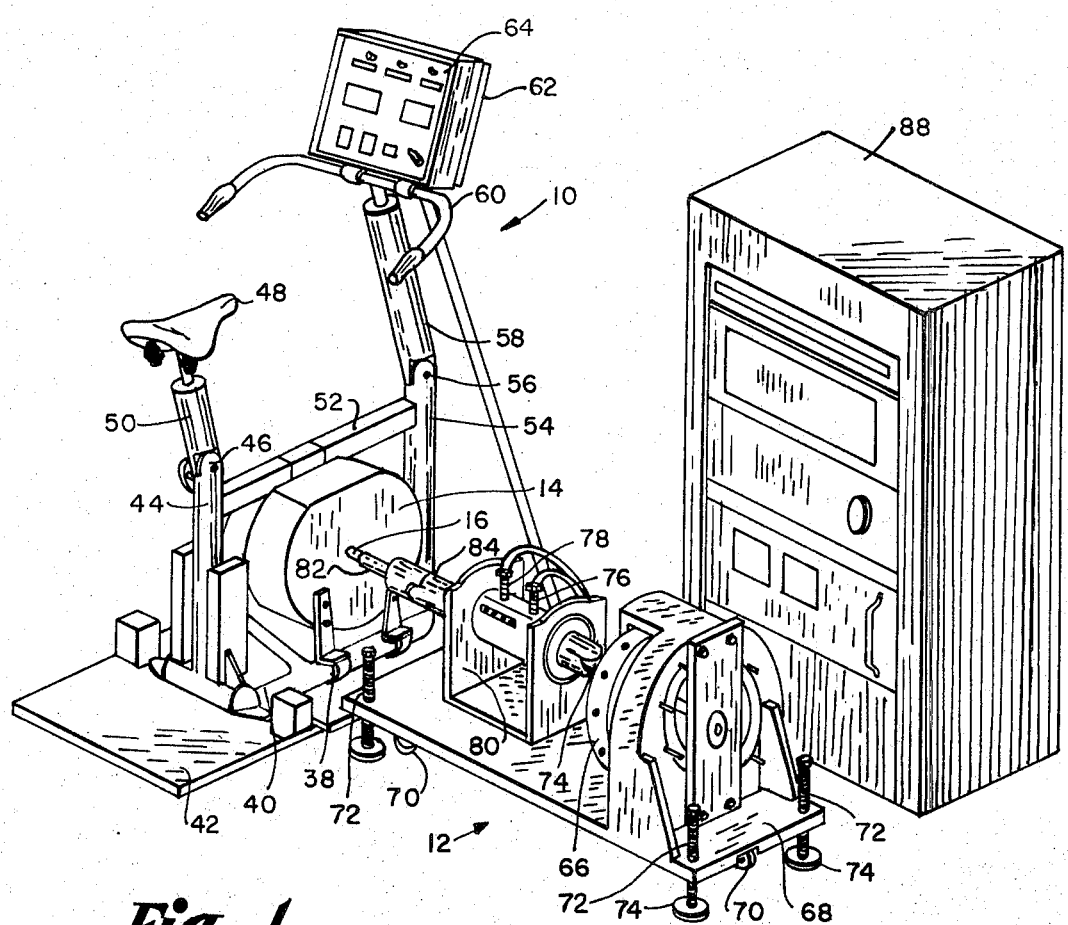
Fig. 1.
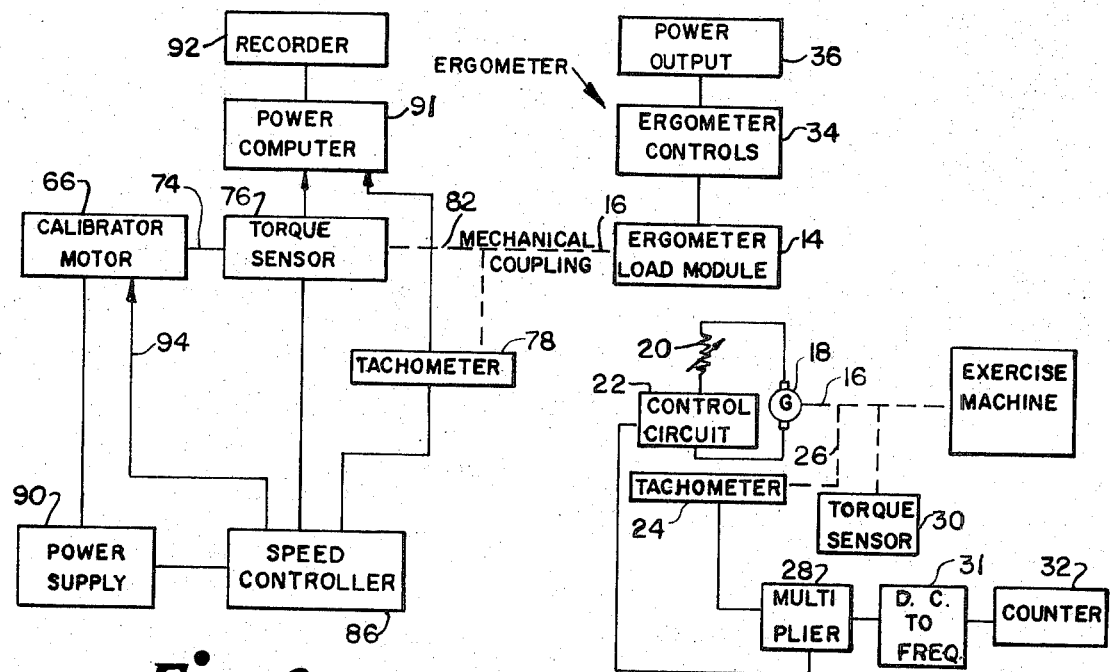
Fig. 2.
Fig. 3.

ERGOMETER CALIBRATOR

ORIGIN OF THE INVENTION

The invention described herein was made by an employee of the United States Government, and made be manufactured and used by or for the Government for governmental purposes without the payment of any royalties thereon or therefor.

BACKGROUND OF THE INVENTION

This invention relates generally to an apparatus for calibrating ergometers, and more particularly to an apparatus which generates electrical signals that can be compared with the output of an ergometer so as to determine if such is producing accurate and true output signals.

Ergometers are used in controlled stressing, conditioning or exercising of people, and are presently being utilized in many health institutions and exercising clinics. In some situations, such as when a patient is exercising as part of a recovery program associated with heart disease, it is important to know the exact amount of work that the patient is developing in peddling the ergometer. One device designed specifically for use in exercising heart patients is disclosed in U.S. Pat. No. 3,744,480, granted to Raymond L. Gause, et al., on July 10, 1973. Another instance where it is important to know the exact amount of work required to peddle an ergometer is in exercising astronauts while in outer space. It is important to record the work output of the astronauts so as to analyze such data to determine the exact amount of exercise needed to maintain the astronauts in proper physical condition. It has been determined that, if the astronauts do not receive sufficient exercise while in a zero gravity condition for an extended period of time, they develop a calcium deficiency in their bones.

Therefore, it can be seen that it is very important that the ergometer being utilized be accurately calibrated. Heretofore, the ergometers were statically calibrated using lever arms and weights. Such a calibration is not practical in all situations due to the time consumed for the calibration.

SUMMARY OF THE INVENTION

The invention is designed for providing a dynamic calibration over a given speed range for ergometers. One such ergometer is disclosed in U.S. Pat. No. 3,744,480 and includes peddles mounted on a rotatable shaft coupled to a D.C. generator. A variable resistance load is utilized for varying the torque required to rotate the D.C. generator. A torque sensor and tachometer are coupled to the shaft for sensing the rate of rotation and the amount of torque used for rotating the shaft. The signals from the tachometer and torque sensor are fed into a multiplier for producing a D.C. signal indicative of the work required to peddle the ergometer.

The apparatus constructed in accordance with the present invention includes a D.C. motor, which is coupled directly to the shaft upon which the peddles are used for rotating the ergometer. A torque sensor is coupled to the shaft which produces a torque signal indicating the torque required to rotate the shaft. A tachometer is also coupled to the shaft for generating an electrical signal indicating the speed of rotation of the shaft. The signals from the torque sensor and the tachometer are fed into a power computer which computes the wattage being used by the D.C. motor for rotating the D.C. generator forming part of the ergometer. A speed controller is coupled between the output of the tachometer and the D.C. motor for enabling the motor to be rotated through a given range of speeds and holding the speed of the motor constant at the various speeds. Thus, by comparing the output signal produced by the apparatus with the output signal produced by the ergometer it can be determined if the ergometer is accurately calibrated. The D.C. motor is mounted on a carriage so that such can be readily maneuvered for coupling to the rotatable shaft of the ergometer.

Accordingly, it is a general object of the present invention to provide an improved apparatus for calibrating ergometers over a predetermined speed range.

Another important object of the present invention is to provide a relatively simple system capable of producing a dynamic calibration of an ergometer over a given speed load.

Still another important object of the present invention is to provide an apparatus for calibrating ergometers which can be readily maneuvered closely adjacent an ergometer and attached thereto.

These and other objects and advantages of the invention will become apparent upon reference to the following specification, attendant claims and drawing.

BRIEF DESCRIPTION OF THE DRAWING

FIG. 1 is a perspective view of a conventional ergometer having a calibration device constructed in accordance with the present invention coupled thereto, FIG. 2 is a block diagram of the calibration device constructed in accordance with the present invention, and FIG. 3 is a block diagram illustrating the controls associated with the ergometer shown in FIG. 1.

DESCRIPTION OF THE PREFERRED EMBODIMENT

Referring first to FIG. 1 of the drawing, there is illustrated an ergometer, generally designated by the reference character 10 coupled to an apparatus, generally designed by the reference character 12, provided for calibrating the components of the ergometer so as to produce a true and accurate work output indication. The ergometer 10 may be any conventional ergometer, and the particular one illustrated is that disclosed in U.S. Pat. No. 3,744,480.

The ergometer 10 includes a load module 14 which in normal operation is driven by bicycle-type peddles mounted on a rotatable shaft 16. The load module 14, as seen in FIG. 3, includes a D.C. motor operated as a generator 18 that has a variable load resistor 20 coupled thereto. The shaft 16 is coupled directly to the shaft of the generator so that when the shaft 16 is rotated by peddling, such in turn, causes the generator to be rotated. The load applied to the generator can be varied by adjusting the resistor 20. Variable loading to the generator 18 is effected by the electrical resistor 20, which can be switched on and off by a control circuit 22 in accordance with pulses of varying widths. The details of the control circuit 22 are described in the above-mentioned U.S. Pat. No. 3,744,480, and is merely shown in block form in the subject application to set forth one particular ergometer that may be calibrated by the subject invention.

A tachometer 24 is coupled to the D.C. generator 18 by a shaft diagrammatically illustrated by broken line 26, and provides a speed output signal to one input of a multiplier 28. A torque sensor 30 is mechanically connected to the shaft of the D.C. generator 18 for providing a torque signal representative of the torque applied by the operator of the exercise machine 10. This torque signal is applied to a second input of the multiplier 28. The multiplier 28 provides a direct current output representative of the rate of work being performed by the exercise machine 10. Calibration of this output by the operator is such that an output of 5 volts is representative of the work rate of 300 watts. This output is indicated or read out by first converting it to a pulse frequency proportional to a voltage by a D.C. frequency converter 31, and then applying the thus converted output to a counter 32, which counts pulses for a predetermined period to derive a direct readout in watts. The circuitry thus described associated with the ergometer is represented in block form in FIG. 2 by the block 34 entitled ergometer control and the block 36 labeled power output.

Referring again to FIG. 1, the load module 14 is suitably mounted on brackets 38 carried on horizontal frame members 40. The horizontal frame members are in turn supported on a rectangular base plate 42. Extending upwardly from the rectangular base plate 42 is a vertical column 44 that has a pivot joint 46 attached thereto. A seat 48 is mounted on another vertical column 50, which is coupled to the pivot joint 46. Suitable bracing 52 extends between the vertical column 44 and another spaced vertical column 54 is carried adjacent the front portion of the ergometer. Extending upwardly from the vertical column 54 and coupled thereto by a pivot joint 56, is still another column 58 into which handle bars 60 are suitably carried. Positioned on top of the handle bars 60 is a console 62 having a front panel 64 which includes appropriate meters and controls sufficient to enable the operator to observe the performance and work output, while peddling the load module 14.

The apparatus constructed in accordance with the present invention is designed to give a dynamic calibration over a given speed range of the ergometer, and includes a D.C. motor 66 which is mounted on a steel platform 68. The steel platform has wheels 70 mounted on the bottom thereof so that the apparatus can be readily maneuvered adjacent the ergometer. Vertically adjustable bolts 72 extend through threaded holes in the corners of the platform 68 so such can be screwed downwardly in order to raise the wheels 70 off of the supporting platform. Disc-shaped washers 74 are carried on the bottom of the bolts. When the bolts are screwed downwardly lifting the wheels 70 off of the floor such holds the supporting platform 68 in a fixed position on the floor.

The D.C. motor 66 has a shaft 74 extending outwardly therefrom to which a torque sensor 76 and a tachometer 78 are coupled in a conventional manner. The torque sensor 76 and tachometer 78 are suitably supported in an upwardly extending U-shaped member 80. Extending out the other side of the U-shaped member 80 is a shaft 82, which is coupled by means of a coupler 84 to the shaft 16 of the ergometer. It is noted that the peddles of the ergometer 10 have been removed for enabling the coupling of the shaft 16 to the shaft 82. Any suitable coupling device may be used for coupling the shafts together.

After the platform 68 has been maneuvered alongside of the ergometer and coupled to the shaft 16 of the load module 14, a speed controller 86 located in a control housing 88 is adjusted to supply sufficient power from any suitable power supply, such as shown at 90 to the D.C. motor 66. At the particular speed set on the speed controller, the torque sensor 76 generates an electrical signal representing the torque produced by the D.C. motor 66 in rotating the load module 14 of the ergometer. The torque sensor may be any suitable conventional torque sensor, such as the one shown in U.S. Pat. No. 3,744,480, which incorporates strain gauges. The torque signal is fed into a power computer 91. The electrical signal produced by the tachometer 78 is also fed to the power computer which may take the form of a multiplier that generates a direct current output representative of the rate of work being performed in rotating the load module of the ergometer. The analog signal from the multiplier is fed directly to a conventional recorder, and is also fed to an analog-to-digital converter whose output goes to digital readout unit on the power computer. The signal produced by the power computer 91 is compared with the output signal produced by the ergometer in order to determine if the ergometer is calibrated properly. Before starting the calibration tests, it is essential that the apparatus be properly calibrated by conventional means, such as lever arms and weights.

The output of the tachometer 78 is also fed back to the speed controller 86 so that a corrective signal can be fed over line 94 to the D.C. motor 66 for maintaining the D.C. motor at a constant speed. After the ergometer has been calibrated for one particular speed, the speed controller is adjusted to various speeds and the process is repeated.

One advantage of the apparatus constructed in accordance with the present invention over conventional static load calibrating systems is that the accuracy of such is not affected by heat generated by the load module, since the D.C. motor 66 is generally heated at the same rate.

While a preferred embodiment of the invention has been described using specific terms, such description is for illustrative purposes only, and it is to be understood that changes and variations may be made without departing from the spirit or scope of the following claims.

What is claimed is:

1. An apparatus for providing a dynamic calibration over a given speed range for an ergometer having a rotatable shaft coupled to a D.C. generator, a variable resistance load coupled to said generator, a first torque sensor sensing the torque required to rotate said shaft, a first tachometer for sensing the rate of rotation of said shaft, and means coupled to said first torque sensor and said first tachometer for generating an electrical signal representing the work being performed by the ergometer, said apparatus comprising:

a. a D.C. motor adapted to be coupled to said shaft for rotating said shaft;
   b. a second torque sensor coupled to said shaft producing a torque signal indicating the torque required to rotate said shaft;
   c. a second tachometer coupled to said shaft generating an electrical signal indicating the speed of rotation of the shaft;

d. means coupled to said second torque sensor and said second tachometer for generating an electrical signal indicating the work being performed by said D.C. motor in rotating said shaft;

e. a speed controller coupled to said D.C. motor for causing said D.C. motor to be rotated at predetermined speeds, and f. a feedback circuit coupled between said second tachometer and said speed controller supplying a signal to said speed controller so as to maintain the rate of rotation of said D.C. motor constant for a predetermined setting of said speed controller, whereby by comparing the electrical signal representing work generated by said ergometer with said electrical signal of said apparatus at various speeds of rotation of said shafts it can be determined if said ergometer requres calibration.

2. The apparatus as set forth in claim 1 further comprising:

a. a carriage supported on a surface;

b. means for mounting said D.C. motor on said carriage;

c. said D.C. motor having a rotatable shaft extending outwardly therefrom, and d. a mechanical coupling connecting said shaft of said D.C. motor to said shaft of said D.C. generator.

3. The apparatus as set forth in claim 2 further comprising:

a. rotatable wheels supporting said carriage for enabling said carriage to be maneuvered adjacent said ergometer, and b. adjustable vertically extending legs carried by said carriage for engaging said surface to lock said carriage in position.

* * * * *